United States Patent
Semsch et al.

(10) Patent No.: US 6,860,563 B1
(45) Date of Patent: Mar. 1, 2005

(54) DEVICE FOR PREVENTING OR REDUCING TIPPING OF THE HEAD

(75) Inventors: Angelika Semsch, Augsburg (DE); Elisabeth Schneider, Senden (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 08/930,735

(22) PCT Filed: Jan. 26, 1997

(86) PCT No.: PCT/DE97/00187

§ 371 (c)(1),
(2), (4) Date: Sep. 19, 2002

(87) PCT Pub. No.: WO97/27076

PCT Pub. Date: Jul. 31, 1997

(30) Foreign Application Priority Data

Jan. 27, 1996 (DE) .......................... 196 02 939

(51) Int. Cl.[7] ................................. A47C 1/10
(52) U.S. Cl. ................ 297/397; 297/220; 297/391; 297/464; 297/488; 5/636; 5/644; 5/622
(58) Field of Search .............. 297/219.1, 219.12, 297/220, 391, 392, 393, 397, 464, 487, 488, 463.2; 5/636, 637, 639, 640, 644, 622

(56) References Cited

U.S. PATENT DOCUMENTS

| | | | |
|---|---|---|---|
| 3,951,453 A | | 4/1976 | Zapf |
| 4,042,278 A | * | 8/1977 | Jensen |
| 4,345,347 A | * | 8/1982 | Kantor |
| 4,617,691 A | * | 10/1986 | Monti et al. |
| 4,707,031 A | | 11/1987 | Meistrell |
| 4,725,253 A | | 2/1988 | Politte |
| 4,738,488 A | * | 4/1988 | Camelio |
| 4,776,049 A | * | 10/1988 | Perron |
| 5,205,611 A | | 4/1993 | Stephens |
| 5,330,255 A | | 7/1994 | Stawicki |
| 5,339,472 A | * | 8/1994 | Yin |
| 5,538,323 A | * | 7/1996 | Henkel |
| 5,544,378 A | * | 8/1996 | Chow |

FOREIGN PATENT DOCUMENTS

| | | |
|---|---|---|
| DE | 21 31 549 | 2/1979 |
| DE | 28 56 366 | 2/1980 |
| DE | 30 23 140 A1 | 1/1982 |
| DE | 40 33 848 A1 | 5/1991 |
| DE | 94 18 878.5 | 3/1995 |
| DE | 295 01 431.8 | 5/1995 |
| FR | 2 534 125 | 10/1982 |
| GB | 2246292 | * 1/1992 |

* cited by examiner

Primary Examiner—Laurie K. Cranmer
(74) Attorney, Agent, or Firm—Laurence A. Greenberg; Werner H. Stemer; Gregory L. Mayback (57) ABSTRACT

A description is given of a device for avoiding or limiting the tilting of the head forwards and/or to the side of a passenger sitting in a seat which has a backrest, having at least one one-piece or multi-piece head-support element which comprises one or more cushion-like elements (1a, 1b; 11a, 11b). The head-tilting protection described is distinguished by the fact that the one or more cushion-like elements are designed and dimensioned such that, in the position worn as intended, they are able to completely surround the side and front sections of the neck and/or of the head of the passenger, resting on the shoulders and/or the chest region of the passenger.

7 Claims, 6 Drawing Sheets

DEVICE FOR PREVENTING OR REDUCING TIPPING OF THE HEAD

The present invention relates to a device in accordance with the preamble of Patent Claim 1, i.e. a device for avoiding or limiting the tilting of the head forwards and/or to the side of a passenger sitting in a seat which has a backrest, having at least one one-piece or multi-piece head-support element which comprises one or more cushion-like elements.

It is known that the head of a passenger tilts or falls slightly forwards and/or to the side, particularly when the passenger is sleeping.

This is an uncomfortable position which can impair sleep and can cause painful contractions of the muscles of the neck.

Moreover, in such situations the mouth of the sleeping passenger often opens, so that saliva can run out, resulting in the unpleasant effect of also affecting the clothing of the sleeping passenger.

If the seat is a seat or a child seat in a car or the like, there is furthermore the risk of the head of the sleeping passenger, which is hanging freely forwards or to the side, being thrown around in an unsupported manner in the event of an accident, which can very quickly lead to serious injuries such as whiplash and the like.

A device which is intended to prevent the head of a passenger from tilting is known from DE 94 18 878 U1; this device is a device in accordance with the preamble of Patent Claim 1.

The known device is a head-support-like arrangement, which can be mounted on backrests of seats by screw clamps or the like. It essentially comprises a flexible rear wall and two side pads. Hook-and-loop fastenings and various rubber coatings, by means of which the pads can be fastened and held together while holding the entire head, are arranged on the side pads. Clearly, this known device does not provide a high level of comfort either when putting it on or when wearing it.

A further device in accordance with the preamble of Patent Claim 1 is known from U.S. Pat. No. 5,330,255. The device described in that document is an inflatable cushion, which is anchored firmly to a vehicle seat and, when used as intended, essentially surrounds the back of the neck and the side parts in particular of the neck; the front part of the neck is largely free, in order to allow the device described to be put on and taken off. As a result, the device is comparatively simple to use, but only prevents the head from tilting forwards to a very limited extent.

The present invention is therefore based on the object of providing a device which is comfortable to put on and wear reliably and safely for avoiding or limiting the tilting of the head forwards and/or to the side of a passenger sitting in a seat which has a backrest.

This object is achieved according to the invention by means of the features claimed in the characterizing part of Patent Claim 1.

Accordingly, it is provided that the one or more cushion-like elements are designed and dimensioned such that, in the position worn as intended, they are able to completely surround the side and front sections of the neck and/or of the head of the passenger, resting on the shoulders and/or the chest region of the passenger.

Due to the fact that the head-support element is designed to completely surround the side and front sections of the neck and/or of the head of the passenger in the position worn as intended, it is possible reliably to prevent the head from tipping to the side and from tipping forwards.

Due to the fact that the head-support element is designed, in the position worn as intended, to rest on the shoulders and/or the chest region of the passenger, there is no need for a particularly stable fastening of the head-support element to the seat or to the passenger; rather, the device according to the invention can be put on, for example, simply by hanging it around the passenger and throwing a part of the device which is connected to the head-support element and is referred to as the connecting section over the backrest and/or the headrest of the seat.

Particularly when the said connecting section is guided over and beyond the backrest of the seat, it proves advantageous if, as claimed in Patent Claim 3, the connecting section is provided with a weight element which, in the position resting or hanging behind the passenger, counteracts any movement of the head-support element out of its intended use position.

If the connecting section is suspended around or over a headrest provided on the seat, it is generally sufficient if the connecting section is suitable, for example, to be placed on the headrest or is designed as a loop or the like which can be laid around the headrest.

Despite the extreme simplicity of putting on the device according to the invention, the latter remains in its intended position (against the neck and/or against the head of the passenger) for a long period of time, where it reliably fulfils its role (holding the head).

Consequently, a device which is comfortable to put on and wear and reliably and safely avoids or limits the tilting of the head forwards and/or to the side of a passenger in a seat which has a backrest has been provided.

Advantageous refinements of the invention form the subject-matter of the subclaims.

The invention is described in more detail below on the basis of exemplary embodiments and with reference to the drawing, in which FIG. 1 diagrammatically shows a top view of a first exemplary embodiment of the device according to the invention for avoiding or limiting the tilting of the head forwards and/or to the side of a passenger in a seat which has a backrest.

The device for avoiding or limiting the tilting of the head forwards and/or to the side of a passenger in a seat which has a backrest is referred to in the following text, for the sake of simplicity, as head-tilting protection for short.

Figure 1:
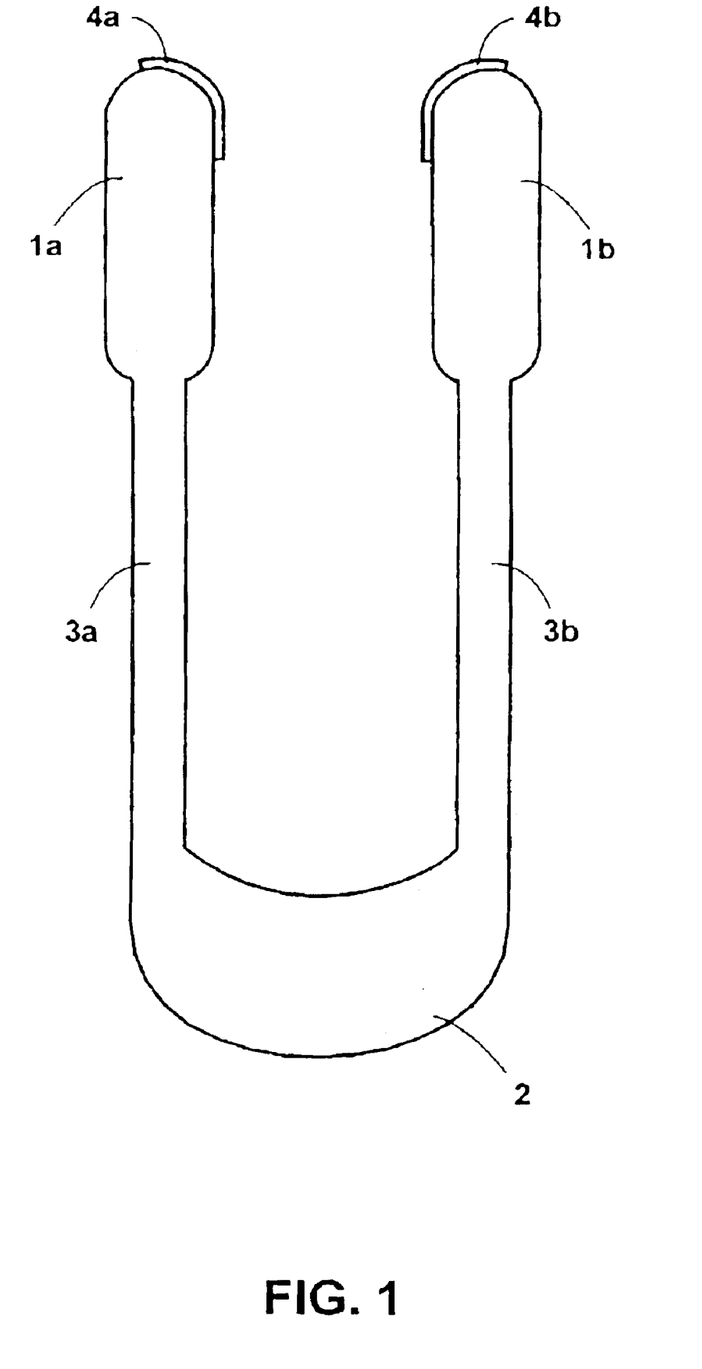

The head-tilting protection shown in FIG. 1 comprises two head-support elements in the form of cylindrical cushions 1a, 1b, a weight element 2 and a connecting section, which connects the cushions 1a, 1b to the weight element 2 and is in the form of two connecting elements 3a, 3b.

The diameter of the cylindrical cushions 1a, 1b is in each case dimensioned such that, in the position in which it rests on a shoulder and/or on the chest region of a passenger and is guided around the neck and optionally around parts of the head (essentially around the lower jaw region of the latter) of the passenger, it can limit tilting of the head in the direction of the cushions. For small and correspondingly light (childrens') heads, it may be sufficient for the cushion only to run along the neck. Particularly for larger and consequently also heavier (adults') heads, it may be necessary additionally also to include the lower jaw region.

Ideally, the length of the cushions 1a, 1b is dimensioned such that the overall length resulting when they are positioned together is just sufficient to completely surround the side sections and the front section of the neck and optionally of the head while resting relatively close against them; current knowledge shows that this is the most comfortable and reliable way of achieving the desired protective effect against tilting of the head. However, the overall length of the cushions may also be longer or shorter (depending, inter alia, on the desired handling, function and mode of action) and the length of the two cushions 1a, 1b may be identical or different.

The cushions 1a, 1b are of elastic design on the one hand, so that they can be deformed in order to rest more or less closely around side and front sections of the neck and optionally of the head and thus in order for the support which they provide for the head to be comfortable. On the other hand, however, they also have a certain minimum rigidity, in order reliably to be able to hold the head, which is prone to tilting, in its intended (untilted) position.

On their mutually facing sides and at their free ends, the cushions 1a, 1b have connecting devices in the form of hook-and-loop elements 4a, 4b. The hook-and-loop elements are designed in such a manner that the two cushions 1a, 1b can be connected to form a single continuous cushion by attaching together the hook-and-loop elements. The location and the nature of a connection of this kind within the combination of cushions can be established by the length of the cushions 1a, 1b and the position and the size of the hook-and-loop elements 4a, 4b; a controlled adjustment to the latter makes it possible to adjust (individually adapt) the ease of handling, the effectiveness and the wearing comfort of the head-tilting protection and the strength of the connection.

Instead of the hook-and-loop elements 4a, 4b, or in addition to the latter, it is also possible to use any other desired connecting devices, such as for example mutually attracting magnets, snap fasteners, normal buttons and the like.

A deformable, but essentially nonelastic core, which under the application of force can be deformed for a long period of time (until the next exertion of force), may be provided inside the cushions 1a, 1b. In order to keep the risk of injury from a core designed in this way low in the event of accidents and the like, this core should be relatively easily deformable. The provision of such a core makes it possible to adapt the shape of the cushion for a long period of time to respective shapes of the neck and/or head.

The cushions 1a, 1b are preferably covered with a removable and washable cover. The hook-and-loop elements 4a, 4b or other connecting devices are in this case provided on the cover or are at least held such that they are freely accessible.

In the present exemplary embodiment, the connecting elements 3a, 3b connecting the cushions 1a, 1b to the weight element 2, as shown in the figure, are support-like elements made of cloth, the cushions 1a, 1b each being connected to the common weight element 2 by means of a separate connecting element 3a, 3b (which is always assigned only to one cushion). The length of the support-like elements or, in more general terms, the dimensions of the connecting elements are to be set in accordance with the position at which the cushions are to be arranged or held and/or depending on how far behind the passenger or at what level behind the passenger the weight element is to be arrangeable. For this purpose, a length-adjustment mechanism may also be provided, with the aid of which the length of the support-like elements (the dimensions of the connecting section) are individually adjustable.

In the present exemplary embodiment, the weight element 2 is formed by sand, which is filled into one or more chambers in a container made of cloth.

Of course, it is also possible to use a wide variety of materials other than sand. In order to keep the risk of injury from the weight element as low as possible, as is very important in particular when the head-tilting protection is used in vehicles (in the event of accidents), the materials which can be used as an alternative are preferably fine-grained and/or elastic materials and/or materials which do not have sharp edges and corners.

Nor is any limitation implied by the fact that the weight element is accommodated in a container made of cloth. The container may also consist of another material or, if the consistency of the material forming the weight allows, may be omitted.

The weight element may be of one-piece or multi-piece design. In the event that it is of multi-piece design, it may be provided for it to be possible to fasten the several parts to one another in a detachable manner. This may be done, for example, by attaching the parts together using buttons, snap fasteners, hook-and-loop fasteners, hooks and the like. Such a configuration of the weight element makes it possible to adapt the weight of the weight element optimally to the prevailing circumstances.

A pocket may be formed on the weight element 2, in which important items, such as for example toys, writing implements, medicaments and the like, can be stored and/or carried, which is very convenient in particular when the head-tilting protection according to the invention is taken on journeys (for use in cars, buses, aeroplanes, trains, ships, when cycling (in the child seat), etc.).

Figure 3:
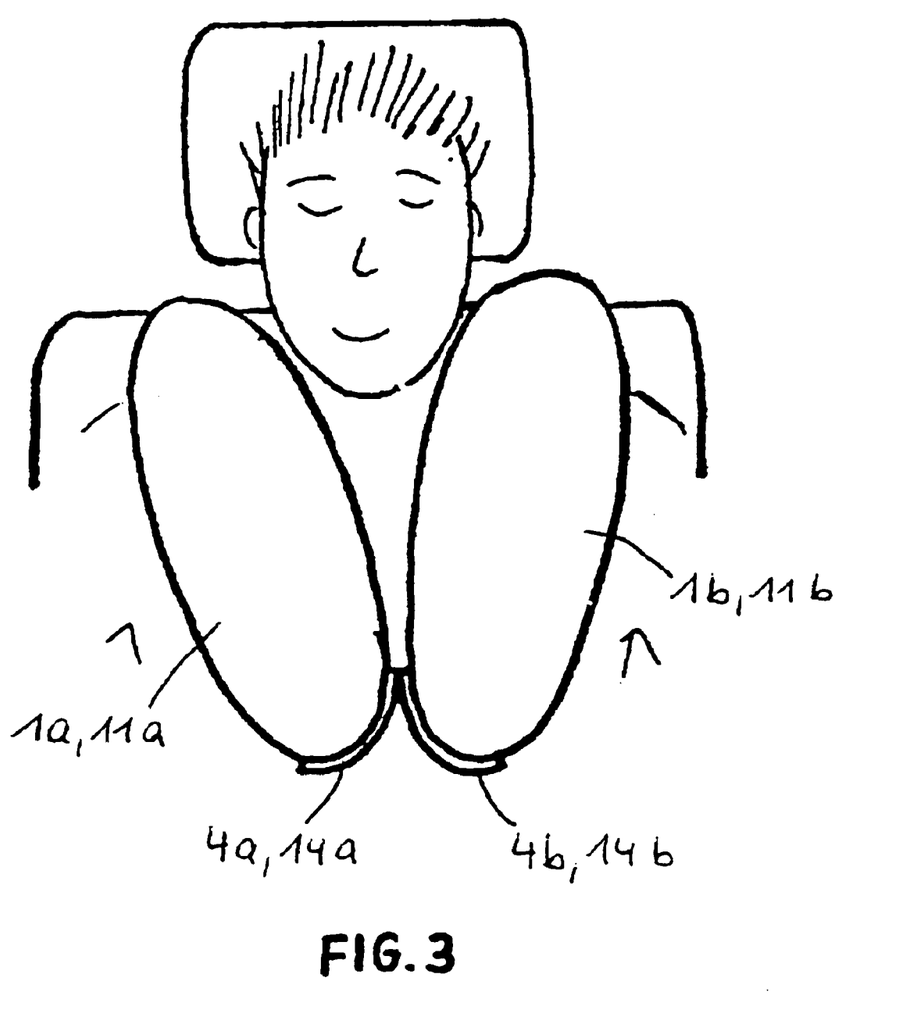
FIG. 3 shows a passenger with the device according to the invention in an intended use position.

In the position worn as intended, the cushions 1a, 1b which are connected by means of the hook-and-loop elements 4a, 4b are arranged resting on the shoulders and/or the chest region of the passenger, around the side sections and/or the front section of the neck and optionally the lower jaw region of the passenger. The weight element 2 is arranged behind the passenger. In this case, the connecting elements 3a, 3b run over the shoulders and/or a backrest of the seat on which the person is sitting.

Figure 5A:
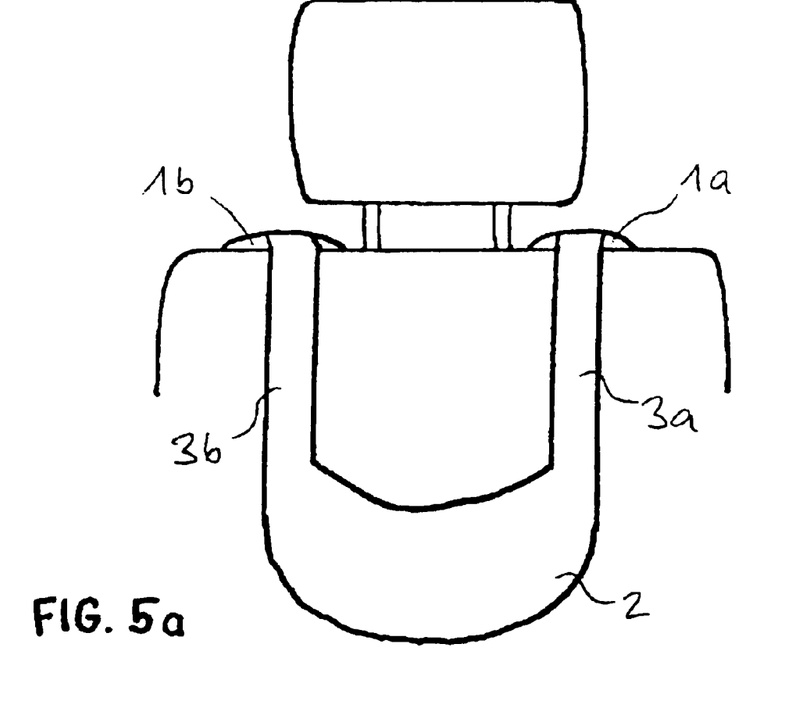
FIGS. 5a and 5b respectively show the device according to the invention with the weight element coming to rest or hanging behind the passenger.
Figure 5B:
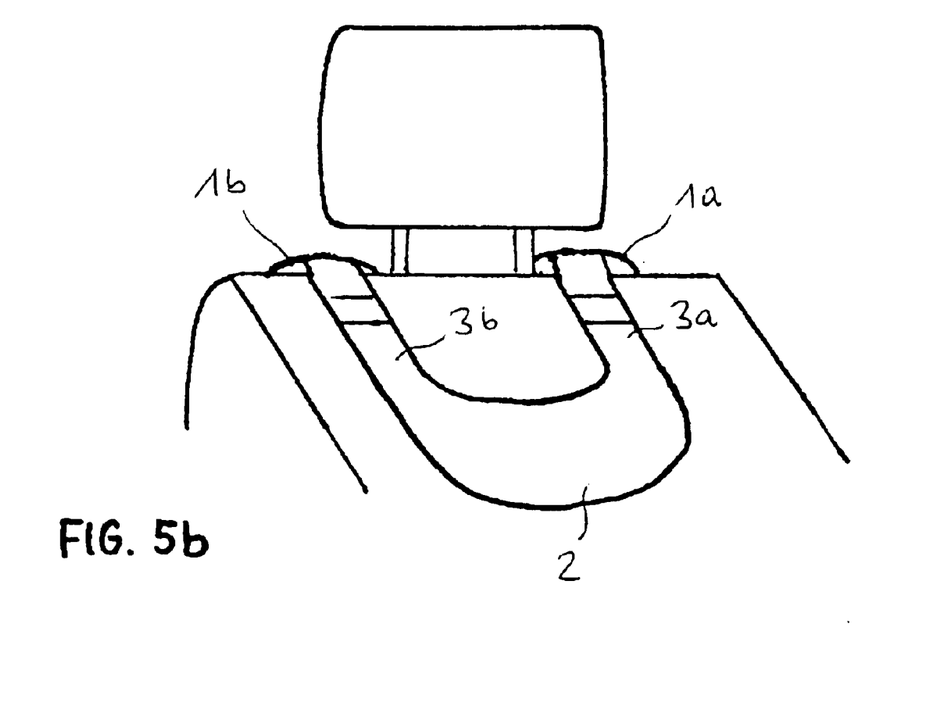
Figure 6:
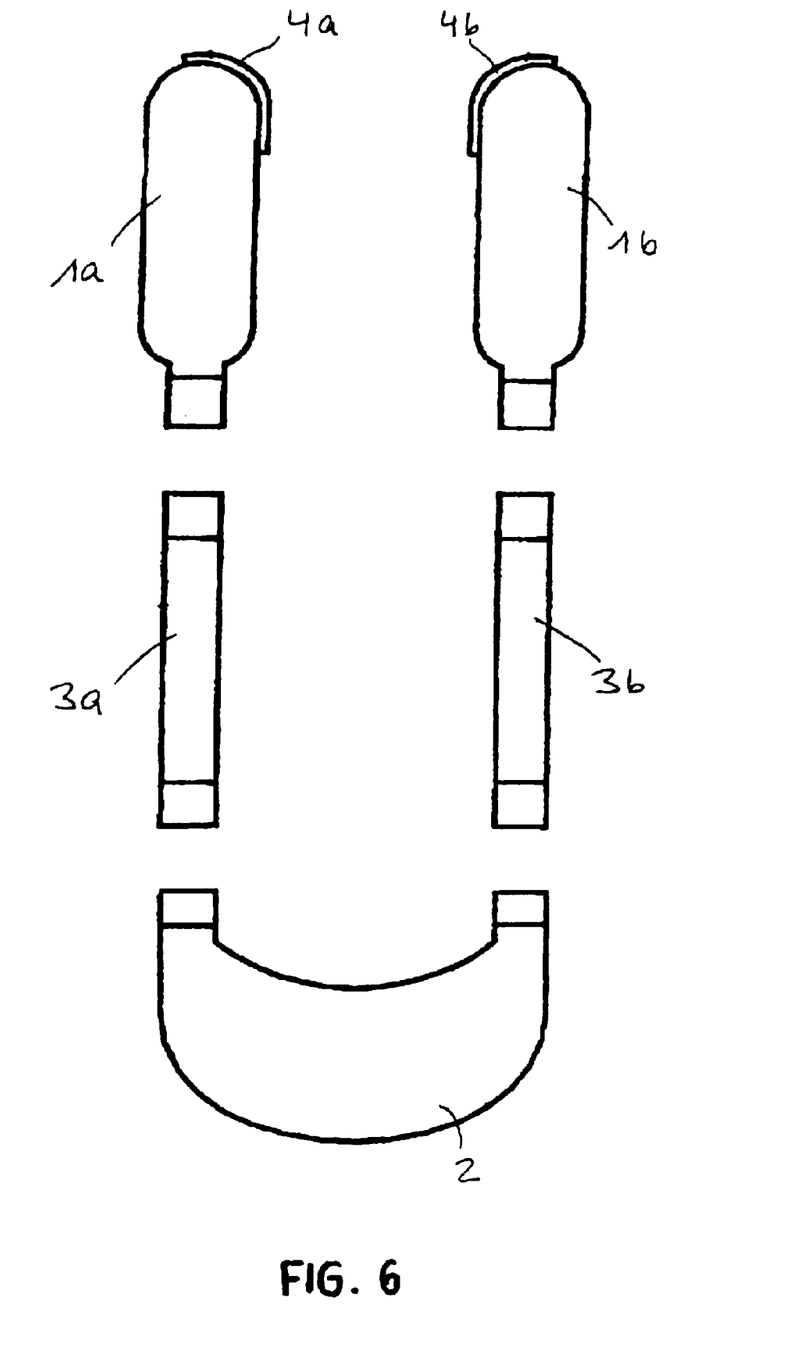
FIG. 6 shows an example of a releasable connecting element.

If the design of the backrest allows, the weight element hangs freely downwards behind the said backrest. This has two effects. Firstly, the cushions, which, if they were not being used as a component of the head-tilting protection according to the invention, would sooner or later drop away from the neck, are actively pulled towards the neck (first effect). Secondly, the connecting elements 3a, 3b are pressed onto the shoulders of the passenger and/or the backrest of the seat, as a result of which sliding of the head-tilting protection over the passenger and/or the seat (as would have to occur for the cushions to slip off the neck) is made considerably more difficult or is ruled out altogether (second effect). Which of these effects is pronounced, and to what extent, depends, inter alia, on the absolute mass of the head-tilting protection, on the distribution of the mass within the head-tilting protection and on the friction between the head-tilting protection and the passenger and/or the backrest. In order to prevent the passenger from being throttled, it should be attempted to keep the first effect relatively low, preferably while providing a pronounced second effect. On the other hand, under certain circumstances—if the passenger is to be allowed to lean forward 13 the second effect should also not be excessively pronounced.

Some designs of backrest do not allow the weight element to hang downwards behind them. This may be the case, for example, for the rear seats of a passenger car. In this case, it may be provided to lay the weight element on a bearing surface behind the backrest (for example on the rear parcel shelf of the car). The weight element then presses onto the bearing surface, as a result of which it is much more difficult, or even completely impossible, for it to slip along the bearing surface (as would have to occur for the cushions to slip off the neck) (third effect).

In general terms, and to summarise, it is desirable for the head-support element (cushions 1a, 1b), the weight element 2 and the connecting elements 3a, 3b each to have a weight and/or surface finish which are such that a level of friction which prevents, or at least substantially limits, slipping of the head-tilting protection worn as intended is produced between the respective elements and regions with which the latter are in contact (the contact does not necessarily have to consist in the elements resting on these regions) or with which they would come into contact in the event of the head-tilting protection worn as intended slipping.

The head-tilting protection described is not dependent on the inclination of the backrest and/or of the upper part of the passenger's body. It can be used equally well in an upright position of the seat and in a virtually horizontal position of the seat (as is to some extent the case with, for example, car child and baby seats).

In the case of car child and baby seats, the connecting elements 3a, 3b are guided over the backrest of the seat on which the child or baby seat is mounted. However, this does not alter the fact that here too the head-support element, the weight element and/or the section connecting the head-support element to the weight element are designed in such a manner that the weight element can be guided over at least one shoulder of the passenger and/or the backrest and can be arranged behind the passenger.

Irrespective of the design of the backrest and the correspondingly adapted use of the head-tilting protection, the head-tilting protection according to the invention in accordance with the above-described first exemplary embodiment proves extremely reliable and safe, despite its multifarious and simple applications.

Figure 2:
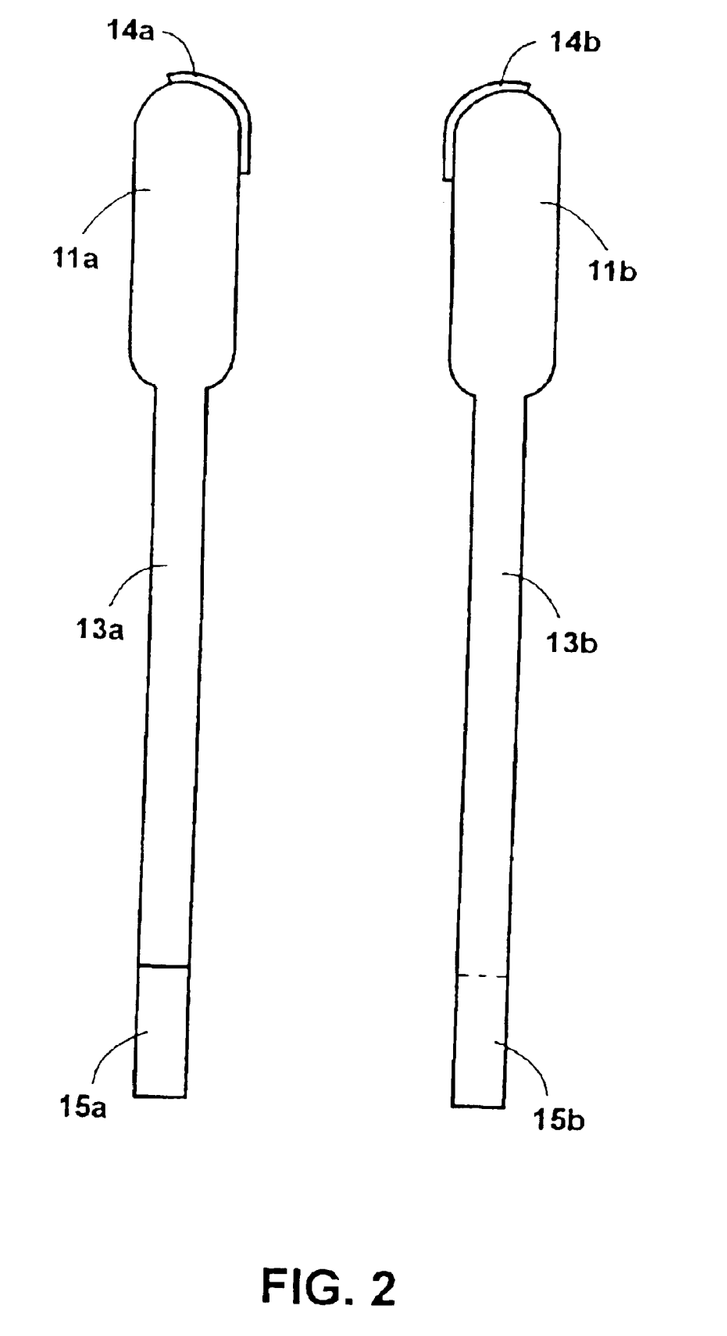
FIG. 2 diagrammatically shows a top view of a second exemplary embodiment of the device according to the invention.

The second exemplary embodiment of the head-tilting protection according to the invention described below with reference to FIG. 2 is designed to be hung around a headrest of a vehicle seat or the like.

As can be seen from FIG. 2, the head-tilting protection in accordance with the second exemplary embodiment comprises two head-support elements in the form of cylindrical cushions 11a, 11b and a connecting section, which extends from the latter, in the form of two connecting elements 13a, 13b.

The design, function and mode of action of the cushions 11a and 11b and hook-and-loop elements 14a, 14b provided on the latter correspond to the cushions 1a, 1b provided in the first exemplary embodiment and the hook-and-loop elements 4a, 4b provided thereon; for this reason, the statements made with regard to the cushions 1a, 1b and the hook-and-loop elements 4a, 4b fully apply also to the cushions 11a, 11b and the hook-and-loop elements 14a, 14b.

The connecting elements 13a and 13b correspond to the connecting elements 3a and 3b of the first exemplary embodiment, with the only difference being that in the second exemplary embodiment currently under consideration, unlike in the first exemplary embodiment explained above, there is no weight element provided on the connecting elements, and that the free end sections of the connecting elements 13a, 13b are provided with connecting devices in the form of hook-and-loop elements 15a, 15b, by means of which they can be releasably connected to one another. Apart from the abovementioned differences, the statements made with regard to the connecting elements 3a, 3b also apply to the connecting elements 13a, 13b.

Figure 4:
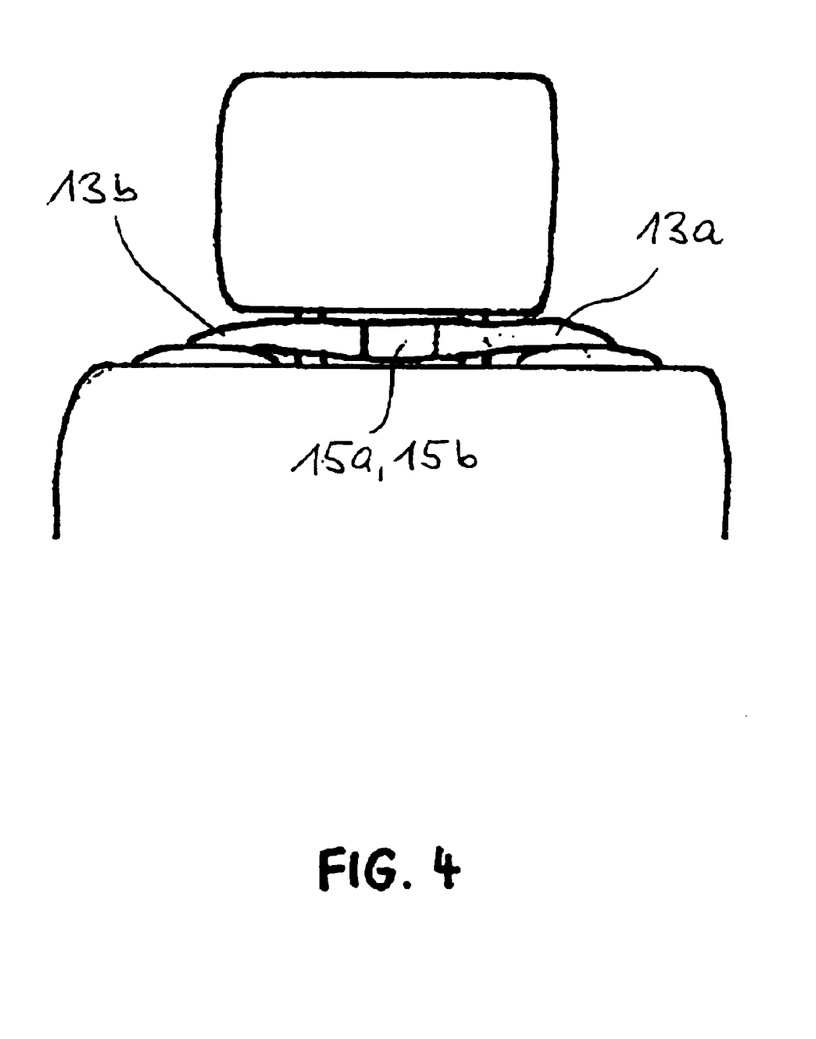
FIG. 4 shows the back of a seat with the connecting section of the device according to the invention around the headrest.

Connecting the connecting elements 13a, 13b by means of the hook-and-loop elements 15a, 15b provided thereon makes it possible to hang them around a headrest arranged on the seat (for example the headrest of a vehicle seat) and hold them there.

Instead of the hook-and-loop elements 15a, 15b, or in addition to the latter, it is also possible to use any other desired connecting devices, such as for example mutually attracting magnets, snap fasteners, normal buttons and the like.

Owing to the relatively large design of the hook-and-loop elements, the latter can be connected to one another in different relative positions, as a result of which the effective dimensions (the effective length) of the connecting sections can be varied, which in turn again makes it possible individually to adjust the position in which the cushions 11a, 11b are to be arranged and held as desired.

The hook-and-loop elements 15a, 15b do not have to be situated on the free end sections of connecting elements 13a, 13b of equal length; they may be provided at any desired location of connecting elements 13a, 13b of equal or different length.

If necessary, one or more weight elements may also be attached to the hook-and-loop elements 15a, 15b or to additionally provided hook-and-loop elements, as a result of which the head-tilting protection under consideration can optionally be used as a head-tilting protection in accordance with the first exemplary embodiment or as a head-tilting protection in accordance with the second exemplary embodiment.

The above-described exemplary embodiments of the head-tilting protection according to the invention each have two cushions which can be joined together as the head-support element. The provision of such a connection of head-support element components which is released automatically under the action of force is particularly advantageous when travelling in a car. This is because if, in the event of an accident, the head of the passenger moves too violently (for example because the passenger was not belted in and is thrown about), the connection between the cushions is released, thus protecting the passenger from injury caused by the head-tilting protection.

The cushion is not limited to a two-part design. Naturally, it is also possible to provide a single cushion which, like the two cushions 1a, 1b or 11a, 11b, completely surrounds the side and front parts of the neck and optionally of the lower jaw region of the head of the passenger. In this case too, however, at least when the head-tilting protection is used in vehicles, it should be borne in mind that it must be possible for the head of the passenger to be released automatically in the event of it moving too violently. This can be achieved, for example, by the said single cushion being connected to the connecting section 3a, 3b or 13a, 13b in an at least partially releasable manner (for example by means of a hook-and-loop closure). Under certain circumstances, it is possible to do without such a releasable connection between the cushion and the connecting section, such as for example if, in the second exemplary embodiment, the connecting section and/or the weight element have connections which release automatically in dangerous situations, thus freeing the head of the passenger.

There is also no limitation on the connection section 3a, 3b or 13a, 13b in each case comprising two support-like elements. Naturally, non-support-like elements and/or connecting elements which are connected to form a continuous unit (connecting elements of one-piece design) are also suitable for use as connecting section.

In the exemplary embodiments described above, all the components of the head-tilting protection are produced from cloth, or at least covered with cloth, but this too does not represent a restriction. Any other desired materials may be used, although it should be ensured that a level of friction which is able to ensure that the head-tilting protection functions as intended is produced between the head-tilting protection components and the shoulders and/or the chest region of the passenger and/or the backrest of the seat.

In the first exemplary embodiment, described initially, of the head-tilting protection according to the invention, the weight element 2 is a weight element which is common to all connecting elements 3a, 3b, but this again does not represent a limitation. As an alternative, it is also possible to provide a plurality of mutually independent partial weight elements (for example one partial weight element per connecting element 3a, 3b). This plurality of partial weight elements may remain permanently separate or may be designed to be releasably connectable, like the cushions 1a, 1b or 11a, 11b, by means of a connecting device.

To summarise, it may finally be stated that the designs described of the head-tilting protection have provided devices which are comfortable to put on and wear for reliably and safely avoiding or limiting the tilting of the head forwards and/or to the side of a passenger sitting in a seat which has a backrest.

List of Reference Numerals

1a Cushion
1b Cushion
2 Weight element
3a Connecting element
3b Connecting element
4a Hook-and-loop element
4b Hook-and-loop element
11a Cushion
11b Cushion
13a Connecting element
13b Connecting element
14a Hook-and-loop element
14b Hook-and-loop element
15a Hook-and-loop element
15b Hook-and-loop element

What is claimed is:

1. A device for avoiding or limiting the tilting of the head forwards and/or to the side of a passenger sitting in a seat with a backrest, comprising:
    at least one one-piece or multi-piece head-support element including one or more cushion-shaped elements, said one or more cushion-shaped elements being configured and dimensioned for, in an intended use position, completely surrounding the side and front sections of the neck and/or of the head of the passenger, resting on the shoulders and/or the chest region of the passenger; and
    a one-piece or multi-piece connecting section for holding said head-support element in said intended use position, said head-support element continuing into said connecting section, said connecting section being configured and dimensioned for guiding over and beyond the backrest of the seat and/or being suspended around or over a headrest provided on the seat by throwing said connecting section over the backrest or around or over the headrest, said connecting section being formed by two flexible-support elements.

2. The device according to claim 1, wherein said head-support element is connected via said connecting section to at least one weight element, said head support element, said connecting section and/or said weight element are configured for said weight element to rest or hang behind the passenger.

3. The device according to claim 2, wherein said weight element is substantially formed by sand which is filled into one or more chambers.

4. The device according to claim 1, wherein said head-support element is formed by cushion-shaped elements which are of elongate shape.

5. The device according to claim 1, wherein said cushion-shaped element or elements forming said head-support element have connecting devices which permit a releasable connection of said cushion-shaped elements to one another and/or a releasable connection to said connecting section and/or to said weight element.

6. A device for avoiding or limiting the tilting of the head forwards and/or to the side of a passenger sitting in a seat with a backrest, comprising:
    at least one one-piece or multi-piece head-support element including one or more cushion-shaped elements, said one or more cushion-shaped elements being configured and dimensioned for, in an intended use position, completely surrounding the side and front sections of the neck and/or of the head of the passenger, resting on the shoulders and/or the chest region of the passenger; and
    a one-piece or multi-piece connecting section for holding said head-support element in said intended use position, said head-support element continuing into said connecting section, said connecting section being configured and dimensioned for guiding over and beyond the backrest of the seat and/or being suspended around or over a headrest provided on the seat by throwing said connecting section over the backrest or around or over the headrest, said connecting section having connecting devices, which permit a releasable connection of parts of connecting sections to one another and/or a releasable connection to said head-support element and/or to said weight element.

7. A device for avoiding or limiting the tilting of the head forwards and/or to the side of a passenger sitting in a seat with a backrest, comprising:
    at least one one-piece or multi-piece head-support element including one or more cushion-shaped elements, said one or more cushion-shaped elements being configured and dimensioned for, in an intended use position, completely surrounding the side and front sections of the neck and/or of the head of the passenger, resting on the shoulders and/or the chest region of the passenger; and
    a one-piece or multi-piece connecting section for holding said head-support element in said intended use position, said head-support element continuing into said connecting section, said connecting section being configured and dimensioned for guiding over and beyond the backrest of the seat and/or being suspended around or over a headrest provided on the seat by throwing said connecting section over the backrest or around or over the headrest, effective dimensions of said connecting section being variable by an adjustment mechanism or variable connection device.

* * * * *

UNITED STATES PATENT AND TRADEMARK OFFICE
CERTIFICATE OF CORRECTION

PATENT NO. : 6,860,563 B1
APPLICATION NO. : 08/930735
DATED : March 1, 2005
INVENTOR(S) : Angelika Semsch et al.

It is certified that error appears in the above-identified patent and that said Letters Patent is hereby corrected as shown below:

On the Title Page
Item [73] should be omitted.

Signed and Sealed this

First Day of April, 2008

JON W. DUDAS
*Director of the United States Patent and Trademark Office*